(12) United States Patent
Steely, Jr. et al.

(10) Patent No.: US 6,904,465 B2
(45) Date of Patent: Jun. 7, 2005

(54) LOW LATENCY INTER-REFERENCE ORDERING IN A MULTIPLE PROCESSOR SYSTEM EMPLOYING A MULTIPLE-LEVEL INTER-NODE SWITCH

(75) Inventors: Simon C. Steely, Jr., Hudson, NH (US); Madhumitra Sharma, Marlborough, MA (US); Stephen R. Van Doren, Northborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 723 days.

(21) Appl. No.: 09/843,228

(22) Filed: Apr. 26, 2001

(65) Prior Publication Data

US 2002/0194290 A1 Dec. 19, 2002

(51) Int. Cl.[7] ........................ G06F 13/00; H04L 12/50
(52) U.S. Cl. ................... 709/238; 709/213; 710/316; 710/317; 370/357; 370/360; 370/368
(58) Field of Search ................. 709/238, 239, 709/204, 206, 213, 214; 710/316, 317; 370/357, 360, 368

(56) References Cited

U.S. PATENT DOCUMENTS

| | | | |
|---|---|---|---|
| 6,055,605 A | 4/2000 | Sharma et al. | |
| 6,088,771 A | 7/2000 | Steely, Jr. et al. | |
| 6,108,737 A | 8/2000 | Sharma et al. | |
| 6,125,429 A | * 9/2000 | Goodwin et al. | 711/143 |
| 6,154,816 A | 11/2000 | Steely et al. | |
| 6,209,065 B1 | * 3/2001 | Van Doren et al. | 711/150 |
| 6,249,520 B1 | 6/2001 | Steely, Jr. et al. | |
| 6,286,090 B1 | 9/2001 | Steely, Jr. et al. | |
| 2001/0037435 A1 | * 11/2001 | Van Doren | 711/153 |
| 2002/0146022 A1 | * 10/2002 | Van Doren et al. | 370/412 |
| 2003/0076831 A1 | * 4/2003 | Van Doren et al. | 370/394 |

* cited by examiner

Primary Examiner—Jack Lane

(57) ABSTRACT

A multiple-processor system in which a commit message is returned to a source processor that requests a memory access operation so as to indicate the apparent completion of the operation includes a multiple-level switch unit linking nodes that contain the processors. The switch unit includes multiple input switches each of which receives messages from multiple nodes, and a set of output switches whose inputs are the outputs of the input switches and whose outputs are the inputs of the nodes. Each switch processes messages in the order in which they are received by the switch and each output switch follows the same rule as the other output switches.

8 Claims, 1 Drawing Sheet

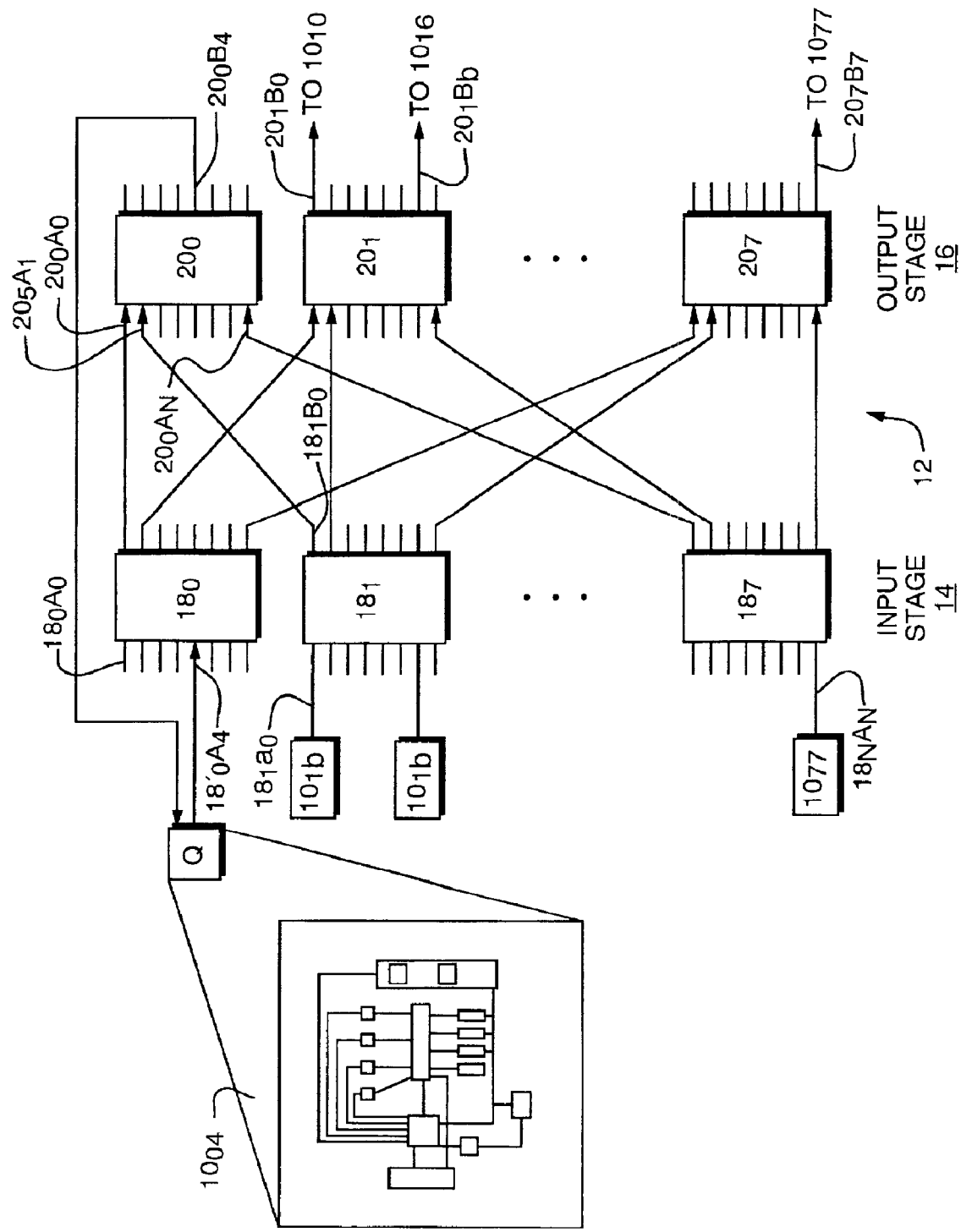

LOW LATENCY INTER-REFERENCE ORDERING IN A MULTIPLE PROCESSOR SYSTEM EMPLOYING A MULTIPLE-LEVEL INTER-NODE SWITCH

BACKGROUND OF THE INVENTION

1. Field of the Invention

This invention relates to the maintenance of data consistency in multiple-processor data processing systems. More particularly it relates to a system having a multiple-level switch unit for inter-processor communications.

2. Background Information

The invention is an extension of the data consistency arrangement described in U.S. Pat. No. 6,108,737 (the '737 patent), issued to the assignee of the present application and incorporated by reference herein. As set forth in that patent, multiprocessing systems, such as symmetric multiprocessors, provide a computer environment wherein software applications may operate on a plurality of processors using a single address space or shared memory abstraction. In a shared memory system, each processor can access any data item without a programmer having to worry about where the data is or how to obtain its value; this frees the programmer to focus on program development, e.g., algorithms, rather than managing partitioned data sets and communicating values. Interprocessor synchronization is typically accomplished in a shared-memory system between processors performing read and write operations to "synchronization variable" either before or after accesses to "data variables".

For instance, consider the following case of processor P1 updating a data structure and processor P2 reading the updated structure after synchronization. Typically, this is accomplished as shown in diagram below, by P1 updating data values and subsequently setting a semaphore or flag variable to indicate to P2 that the data values have been updated. P2 checks the value of the flag variable, and if set, subsequently issues read operations (requests) to retrieve the new data values.

| P1 | | P2 | | |
|---|---|---|---|---|
| Store Data, New-value | | L1:Load | Flag | |
| Store Flag, 0 | | BNZ | L1 | |
| | | Load | Data | |

Note the significance of the term "subsequently" used above; if P1 sets the flag before it completes the data updates or if P2 retrieves the data before it checks the value of the flag, synchronization is not achieved. The key is that each processor must individually impose an order on its memory references for such synchronization techniques to work. The order described above is referred to as a processor's inter-reference order. Commonly used synchronization techniques require that each processor be capable of imposing an inter-reference order on its issued memory reference operations.

The inter-reference order imposed by a processor is defined by its memory reference ordering model or, more commonly, its consistency model. The consistency model for a processor architecture specifies, in part, a means by which the inter-reference order is specified. Typically, the means is realized by inserting a special memory reference ordering instruction, such as a Memory Barrier (MB) or "fence", between sets of memory reference instructions. Alternatively, the means may be implicit in other opcodes, such as in "test-and-set". In addition, the model specifies the precise semantics (meaning) of the means. Two commonly used consistency models include sequential consistency and weak-ordering, although those skilled in the art will recognize that there are other models that my be employed, such as release consistency.

In a weakly-ordered system, an order is imposed between selected sets of memory reference operations, while other operations are considered unordered. One or more memory barrier MB instructions are used to indicate the required order. In the case of an MB instruction defined by the Alpha 21262 processor instruction set, the MB denotes that all memory reference instructions above the MB (i.e., pre-MB instructions) are ordered before all reference instructions after the MB (i.e., post-MB instructions). However, no order is required between reference instructions that are not separated by an MB.

| P1: | | P2: | | |
|---|---|---|---|---|
| Store Data1, New-value1 | | L1:Load | Flag | |
| Store Data2, New-value2 | | | | |
| MB | | BNZ | L1 | |
| Store Flag, 0 | | MB | | |
| | | Load | Data1 | |
| | | Load | Data2 | |

In the above example, the MB instruction implies that each of P1's two pre-MB store instructions are ordered before P1's store-to-flag instruction. However, there is no logical order required between the two pre-MB store instructions. Similarly, P2's two post-MB load instructions are ordered after the Load Flag; however, there is no order required between the two post-MB loads. It can thus be appreciated that weak ordering reduces the constraints on logical ordering of memory references, thereby allowing a processor to gain higher performance by potentially executing the unordered sets concurrently.

In order to increase performance, modern processors do not execute memory reference instructions one at a time. It is desirable that a processor keep a large number of memory references outstanding and issue, as well as complete, memory reference operations out-of-order. This is accomplished by viewing the consistency model as a "logical order", i.e., the order in which the memory reference operations appear to happen, rather than the order in which those references are issued or completed. More precisely, a consistency model defines only a logical order on memory references; it allows for a variety of optimizations in implementation. It is thus desired to increase performance by reducing latency and allowing (on average) a large number of outstanding references, while preserving the logical order implied by the consistency model.

In prior systems, a memory barrier instruction is typically contingent upon "completion" of an operation. For example, when a source processor issues a read operation, the operation is considered complete when data is received at the source processor. When executing a store instruction, the source processor issues a memory reference operation to acquire exclusive ownership of the data; in response to the issued operation, system control logic generates "probes" to invalidate old copies of the data at other processors and to request forwarding of the data from the owner processor to the source processor. Here the operation completes only when all probes reach their destination processors and the data is received at the source processor.

Broadly stated, these prior systems rely on completion to impose inter-reference ordering. For instance, in a weakly-ordered system employing MB instructions, all pre-MB operations must be complete before the MB is passed and post-MB operations may be considered. Essentially, "completion" of an operation requires actual completion of all activity, including receipt of data and acknowledgements for probes, corresponding to the operation. Such an arrangement is inefficient and, in the context of inter-reference ordering, adversely affects latency.

The '737 patent describes a multiple "hierarchical" system in which the processors are grouped in nodes that are connected by a hierarchical switch. The system has a common memory address space, with portions of the address space assigned to random access memory units in the respective nodes. Each node is termed the "home" node for its assigned address space. Each processor maintains its own cache memory containing copies of the contents of blocks of memory locations that have been accessed by the processor. Each of the home nodes maintains a record identifying the processors having cache copies of the contents of the various blocks of memory locations assigned to that node. For each memory block the record also includes identification of the processor that last wrote to that block, the latter processor being termed "the owner" of the block. Each of the nodes also maintains a directory identifying the home nodes of the various portions of the common memory address space.

A program running on a processor in a "source" node may require write access to a memory block x. If the home node of the block x is another node, the source node transmits a RDModx request through the hierarchical switch to the home node. The home node responds by sending the hierarchical switch a FRDModx message identifying the block x and also the various nodes that are involved in the memory access request. The switch then transmits a set of atomic messages to (1) the owner of block x, (2) the processors having copies of block x, (3) the source processor and the home node. The recipients of the messages treat them in accordance with their relation to the request i.e., a probe of the appropriate type, a marker or an acknowledgement. That is, the owner of block x transmits the data to the source node; the processors having the copies of block x treat those messages as cache invalidate messages; the source node interprets its message as a "commit" message indicating that the source node is the new owner node of block x and that it can rewrite the contents of the block; and the home node treats the message as an acknowledgement. This arrangement eliminates the latency that would be involved if the source node had to wait for acknowledgments of the probe messages. All other inter-node memory operations are handled in the same manner by the switch.

The MB instruction discussed above is essentially supported by a counter. The counter is incremented each time a memory reference instruction is issued and it is decremented each time a commit signal is returned by the system. The MB instruction is completed when all the memory references preceding it have issued and the counter has returned to zero i.e., all of the corresponding commit messages have been received. As described above these commit messages travel in an ordered channel with other messages.

When the hierarchical switch processes the FRDModx message from the home node it ideally transmits all of the atomic messages simultaneously over its corresponding output ports. That is, the transmissions from the hierarchical switch to various nodes for a memory write operation would ideally be made simultaneously, i.e. during the same clock cycle. The message requests received by the switch are processed one-by-one in successive clock cycles. Accordingly, any node that receives atomic messages relating to different memory access requests will receive them in the same order as the other nodes in the network. Inasmuch as each node (and each processor) processes incoming messages in the order in which they are received, this means that all processors have the same view of the contents of the shared memory at corresponding points in their program streams.

In practice the hierarchical switch may be incapable of transmitting a complete set of atomic messages simultaneously. In that case it is sufficient that each "commit" message and also each acknowledgement returned by the hierarchical switch to a home node be transmitted from the switch no earlier than any of the other atomic messages corresponding to the same memory access request.

When the system is scaled upward in size, data consistency without undue latency is again a problem. It is undesirable to enlarge the hierarchical switch because the amount of traffic through a single switch will slow down inter-node communications. A multiple-switch configuration resolves this problem. However, the atomic messages involved in a memory access request, transmitted by a switch to which the home node is connected, will pass through other switches to reach the target nodes for these messages. If a switch connected to another home node transmits atomic messages at the same time to any of the same target nodes, the message order required to maintain system-wide data coherency may not be obtained. This will result in loss of data consistency.

SUMMARY OF THE INVENTION

A system incorporating the invention includes that comprises a bank of input switches and a bank of output switches, all of which may have the same configuration as the inter-node hierarchical switch described in the '737 patent. The input terminals of each input switch receive messages from respective system nodes and the output terminals of each input switch are connected to input terminals of the output switches. The output terminals of the latter switches, in turn, transmit messages to the system nodes. All of the switches in the switching unit operate in synchronism, that is, they operate in response to the same clock signal or, in the case of the output switches, they may operate in response to clock signals forwarded from the input switches.

The input switches follow the same ordering rules as the hierarchical switch described in the '737 patent. Thus, when a home node transmits a memory-access message, e.g. FrdMod, the input switch connected to that node transmits the corresponding atomic messages, with the commit message and the acknowledgement to the home node being transmitted no earlier than any of the other atomic messages.

The "membrane" comprising the paths from the input switches through the output switches incorporates two rules. The first of these is that all paths maintain message order. Specifically, if a set of atomic messages from one input switch enters the membrane before a set of atomic messages from a second switch, the commit message from the first input switch leaves the membrane before the commit message from the second input switch.

The second rule is a corollary of the first, dealing with the case where atomic messages from multiple memory access requests enter the membrane at the same time, i.e., during the same clock cycle. Each output switch uses the same rule in selecting from simultaneous inputs from two or more input switches. For example, if the switches in the input bank are identified by the numbers 0 ... N, each switch in the output bank might order simultaneous inputs in the ascending order of the identification numbers of the input switches.

In effect, the second rule imposes a uniform pseudo order of arrival messages simultaneously transmitted by two or more input switches to the same output switch. With the membrane configured to follow the foregoing rules, the system achieves the same system-wide cache consistency as the single-switch system described in the '737 patent, again without incurring the extended latency characteristic of waiting for acknowledgement of receipt of atomic messages.

BRIEF DESCRIPTION OF THE DRAWINGS

The drawing is a diagram of a system incorporating the invention.

DETAILED DESCRIPTION OF AN ILLUSTRATIVE EMBODIMENT

As shown in FIG. 1, a multiprocessor system incorporating the invention includes a plurality of processor nodes $10_\infty$ ... $10_{77}$ interconnected by a switch unit generally indicated at 12. Each of the nodes, by way of example, may be configured, as illustrated in U.S. Pat. No. 6,108,737, to include four processors, each of which is provided with its own cache memory. Each node may also contain a portion of the random access memory shared by the entire system; it is the "home" node for that part of the system-wide memory address space. Each node operates on incoming messages in the order in which they are received. Each processor within the node also operates on incoming messages in the order in which it receives them. The invention relates to the manner in which the contents of a block of the shared memory can be modified while maintaining consistency in the system-wide views of the block and without incurring undue latency in the operation.

The switch unit 12 comprises an input stage 14 and an output stage 16. The input stage 14 comprises a set of identical switches $18_0$ ... $18_7$ and the output stage 16 comprises a set of identical switches $20_0$ ... $20_7$. The switches 18 and 20 have the same configuration as the hierarchical switch in the '737 patent, except that the addressing capabilities are expanded to fit the larger size of the overall system.

The input terminals $18_A$ of the switches 18 receive messages from the respective nodes 10 and the output terminals $18_B$ of the switches 20 transmit messages to the corresponding nodes. The input terminals $20_A$ of the switches 20 are connected to the output terminals of the switches 18 as shown. With this configuration a message can pass from any node to any other node in the system by way of the switch unit 12.

More specifically, the switch $18_0$ has input terminals $18_0A_0$–$18_0A_7$ and output terminals $18_0B$–$18_0B_7$. The output switch $20_0$ has input terminals $20_0A_0$–$20_0A_7$ and output terminals $20_0B_0$–$20_0B_7$. The input and output terminals of the remaining switches are similarly designated. To simplify implementation of the ordering rules for the inputs of the output switches and the addressing scheme used by the input switches, the subscripts of the reference numerals designating the input terminals also identify the input switches to which they are connected. Thus, the input terminal $20_0 A_1$ receives its inputs from switch $18_1$. Similarly the reference numerals for the output terminals of the input switches also designate the output switches to which they are connected. Thus, the output terminal $18_7B_0$ is connected to the input terminal $20_0A_7$.

Memory access requests in which a node 10 (1) contains the processor issuing the request; (2) is the home node of the affected memory block; (3) is the owner node of the block; and (4) is the only node containing any other cache copies of the contents of the block, are handled entirely within that node and thus do not involve the switch unit 12. On the other hand, assume a write access request for memory block x, in which the source node, the home node and the owner node are different and furthermore in which one or more other nodes have cache copies of block x. The write access request (RdModx) is transmitted by the source node through the switch unit 12 to the home node of block x.

In response the home node transmits a FRdModx message capsule to the input switch 18 to which the home node is connected. This message capsule includes (1) cache is invalidate messages for those processors having cache copies of x; (2) an FrdModx message to the owner of block x; and (3) an FMModx message to the source processor. The switch 18 multicasts the messages from the home node to the processors identified in the FRDModx message and each processor interprets message according to its status in the request, i.e. possessor of a cache copy of block x, owner of block x or source of the request. The FRDModx message, which serves as a "commit" message to the source and the probe-ack (acknowledgement) message to the home node are transmitted by the input switch 18 no earlier than the probe type messages, i.e. the cache invalidate and FRDModx messages. The system treats the original RdModx request from the source node as ordered as of the time the commit and probe-ack messages are transmitted by the input switch 18.

Consider the following example involving two memory variables, "x" and "y". Two processors, P1 and P4, are involved. The home of x is the node containing P1 and the home of y is the node containing P4. P1 has a copy of y in its cache and P4 has a copy of x in its cache. The initial values of x and y are 1. The instruction streams for P1 and P4 contain the following sequences.

| P1 | home of x | P4 | home of y |
|---|---|---|---|
|  | (has copy of y) |  | (has copy of x) |
|  | Wr x=2 |  | Wr y=2 |
|  | MB |  | MB |
|  | Rd y |  | Rd x |

For memory consistency to be maintained, it is acceptable if one of the read operations returns the value 1 but not if both return that value.

More specifically, when P1 executes the Wr x=2 instruction it issues a RdModx command to its local memory directory. The directory indicates that P4 has a copy of x, so a message is sent to P4 to invalidate the copy of x in P4 's cache. At the switch, this message is a multicast message. It generates an Inval x message to P4 and a commit message to return to P1. Similarly, in parallel, when P4 executes the Wr y=2 instruction it issues a RdMody command to its local memory directory. The directory indicates that P1 has a copy of y, so a message is sent to P1 to invalidate the copy of y in P1 's cache. Again, at the switch this message is a multicast message: it generates an Inval y message for P1 and a commit message to P4. In the system described in the '737 patent, there are two legal orders for the transmissions from the hierarchical switch, either the Inval x is first or the Inval y one is first. Thus the paths from the hierarchical switch back to processors will contain the following message sequences:

| Path to P1 from switch unit | Path to P4 from switch unit |
|---|---|
| 1) Inval y<br>   commit-message x | commit-message y<br>Inval x |
| or | |
| 2) commit-signal x<br>   Inval y | Inval x<br>commit-signal y |

Thus the required cache consistency is maintained, inasmuch as one of the two sides will process an Inval message before the commit message and hence, when the subsequent read operation is executed, it will sense a cache miss and obtain the latest value (i.e., 2) from the home node.

With the multi-level switch unit 12 described above, a third order is possible. Assume, for example, that the input switch connected to P1 transmits both the Inval x and commit x messages at the same time and that the input switch connected to P4 transmits the commit y message after it transmits the Inval y message. Assume also that the output switches connected to these input switches receive only the messages from these two input switches. The following order will result:

| Path to P1 from switch unit | Path to P4 from switch unit |
|---|---|
| 3) Inval y<br>   commit-signal x | Inval x<br>commit-signal y |

In this case the cache copies on both sides are invalidated before the commit message is received. Thus, both of the subsequent read operations ultimately obtain the new value 2. The only illegal order would be:

| P1 | P4 |
|---|---|
| commit message x<br>inval y | commit message y<br>inval x |

This order is thus impossible because the rules of the switch unit 10 require that the commit message in a packet must be transmitted from the switch unit 12 no later than the cache inval messages in that packet. This order is possible only if the cache inval components of the multicast message packet are transmitted from the switch unit 10 after the source component, i.e., the commit message.

What is claimed is:

1. A multiple-processor system comprising:
 a) A plurality of nodes, each node including one or more processors, a shared memory space, portions of which are resident in respective nodes;
 b) an inter-node switch unit linking each of the nodes with other nodes to provide the communication among the nodes, the switch unit serving as an ordering point for memory reference requests; said switch unit comprising:
 1. a plurality of input switches, each of which (a) is connected to receive messages transmitted by a different group of processors; (b) and is configured to transmit messages selectively over a plurality of inter-switch output terminals, and (c) issues atomic messages corresponding to each memory reference request from a node connected to that switch; and
 2. a plurality of output switches, each of which: (a) is connected to receive messages from an inter-switch output terminal of each of the input switches, (b) selectively transmits outputs to a group of nodes connected to that switch; and (c) follows the same ordering rule relative to input switches from which the messages are received simultaneously.

2. The system defined in claim 1 in which all of said input switches operate in synchronism with the same clock.

3. The system defined in claim 2 in which all of said output switches operate in synchronism with the same clock.

4. The system defined in claim 1 in which all of said output switches operate in synchronism with the same clock.

5. The system defined in claim 1 in which
 A. a source node containing a processor that issues a memory write request transmits the request to a home node of the memory location involved in the request;
 B. the home node transmits to the input switch connected thereto a message packet identifying (1) the memory location, (2), the processors having copies of contents of the memory location and (3) the processor that is the source of the request; and
 C. The input switch transmits (1) messages identifying the memory location to the processors identified in the message from the home node, and (2) acknowledgement message to the home node, the messages from the switch to the source node and the home node being transmitted no earlier than any of the other messages.

6. The system defined in claim 1 wherein:
 the connections between the input switches and the output switches define paths, and
 all paths maintain message order.

7. The system defined in claim 1 wherein one or more of the atomic messages corresponding to a memory reference request include a commit-signal structure indicating apparent completion of the memory reference request rather than actual completion of the request.

8. The system defined in claim 1 wherein the inter-node switch is configured to impose a weak-ordering consistency mode wherein inter-reference ordering is imposed by a memory barrier (MB) instruction inserted between sets of memory reference requests.

* * * * *